Oct. 15, 1929.  W. S. GOODELL  1,732,010

BARBECUE MEAT ROASTER

Filed Nov. 6, 1926

Inventor:
William S. Goodell,
By Joshua R. H. Potts
his Attorney.

Witnesses:

Patented Oct. 15, 1929

1,732,010

UNITED STATES PATENT OFFICE

WILLIAM S. GOODELL, OF RACINE, WISCONSIN, ASSIGNOR, BY MESNE ASSIGNMENTS, OF ONE-HALF TO ANDREW RASMUSSEN, OF RACINE, WISCONSIN

BARBECUE MEAT ROASTER

Application filed November 6, 1926. Serial No. 146,592.

My invention relates to barbecue meat roasters and particularly to that class wherein the roasts are continuously rotated before an open fire-place or within an oven.

Heretofore with barbecue meat roasters it has been the practice to baste the meat by hand. This in addition to being very laborious does not result in an even or uniform cooking of the meat. With these objections in mind it is a primary object of my invention to provide means for circulating the basting liquid from the usual drip pan and discharging the same over the rotating roasts for a predetermined period.

Further, the invention contemplates means for applying and discharging the basting liquid over the rotating roasts together with means for controlling the flow to the meat or roasts upon any one of the rotating shafts.

With the preceding and other objects and advantages in mind, the invention consists in the novel combination of elements, construction and arrangement of parts, and operations to be hereinafter specifically referred to, claimed and illustrated in the accompanying drawing wherein, Fig. 1 is a vertical sectional view of a barbecue meat roaster embodying my invention;

Figure 1:
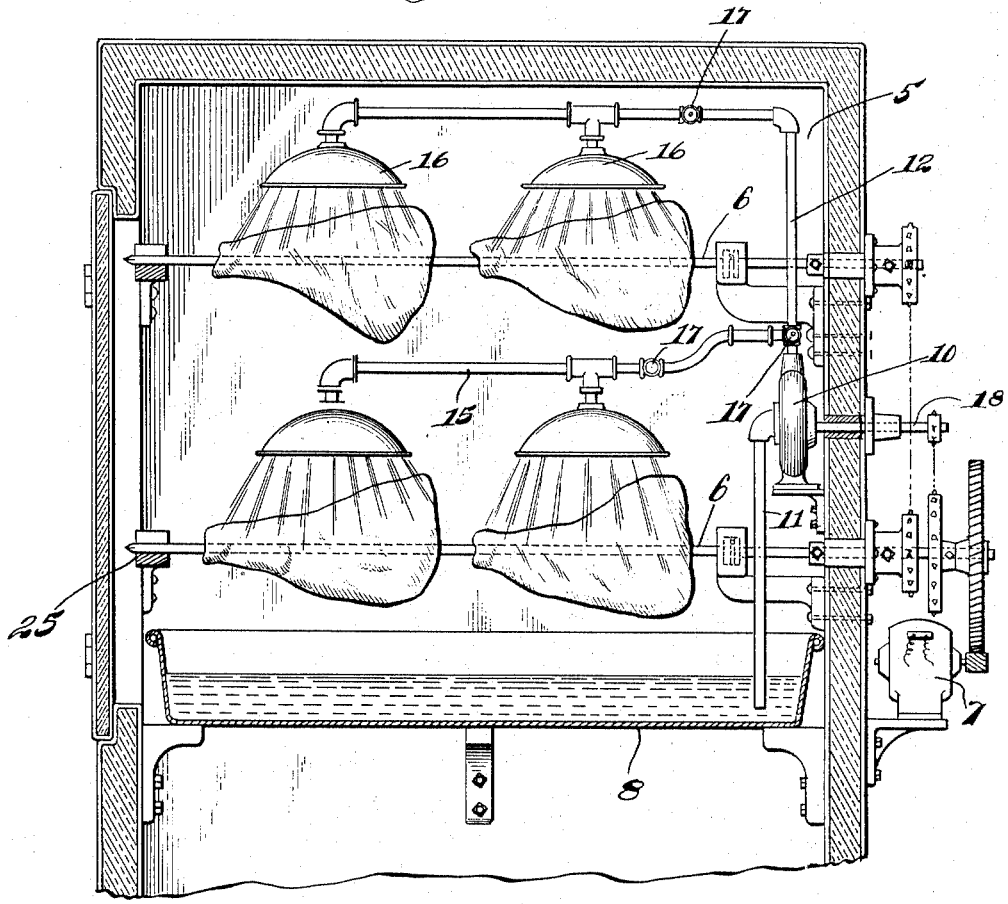
Figure 3:
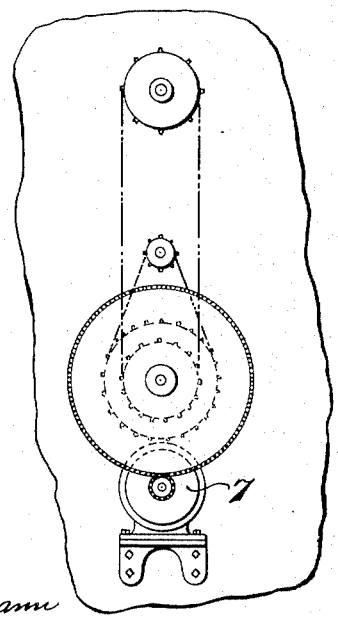
Fig. 3 is an end elevation.
Figure 2:
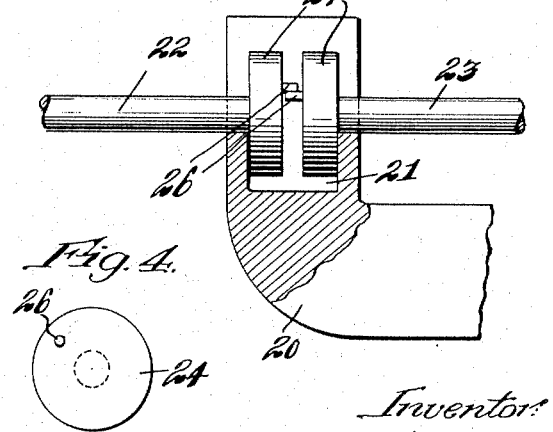
Fig. 2 is a fragmentary detail view of a clutch connection and mounting of one of the meat supporting shafts embodied in my invention.
Figure 4:
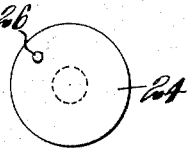
Fig. 4 is an elevation of one of the clutch elements embodied in the invention.

Referring to the invention in detail, a conventional barbecue open fire-place is designated at 5 including the horizontally arranged roast supporting shafts 6, driving motor 7 geared thereto and drip pan 8 supported below the lowermost shaft 6. If desired an enclosed oven may be employed in lieu of the open fire-place.

The present invention contemplates pumping or drawing the basting liquid from the pan or receptacle 8 and discharging the same over the roasts supported upon the shafts 6 for a predetermined period. To that end I provide a pump 10 which in this instance is of a rotary centrifugal type but, however, may be of the reciprocating type. A vertical inlet pipe 11 leads from the pump and has its lower end arranged in the receptacle or pan 8. An outlet pipe 12 leads from the pump outlet and is provided with parallel horizontal branches 15 which overlie the roasts on the shafts 6. Leading from each pipe 15 and arranged above each of the roasts is a spray head or rose 16 from which the basting liquid is sprayed onto the roasts.

In order to control the flow of basting liquid to the pipes 12 and 15 each of the latter is equipped with a cutoff 17. It will be thus seen that the flow to either one of the branches 15 may be severed in the event the underlying shaft does not contain roasts or the entire flow severed by manipulating a proper valve.

As shown in Fig. 1 the shafts 6 are driven from the motor 7. It will be observed that I have utilized this motor as driving means for the pump 10 by extending the shaft 18 thereof through one side of the fire-place and connecting the same with the motor driven gearing.

In accordance with the present invention I also provide a removable coupling or clutch for each of the shafts to permit of its ready removal for the purpose of placing the roasts thereon. This coupling or clutch comprises a bracket 20 having its upper end bifurcated and formed with a recess 21 in its base. The shafts 6 are made of sections 22 and 23, the latter being permanently supported and driven from the gearing as shown. The other section 23 adapted to contain the roasts has its outer end rotatably and removably supported in a bearing 25 in longitudinal alinement with the bracket 20. The opposed ends of each of the shaft sections 22 and 23 are provided with a circular head 24 each of which carries an outstanding lug 26 which normally interlocks or overlaps each other to cause the two sections to rotate as a unit. It will be observed that when it is desired to remove the section 22 for the purpose of applying the roasts it is only necessary to lift the same from the brackets 20 and 24.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

In combination with a barbecue meat roaster having a plurality of removable rotatable spits, means for connecting said spits to a source of rotary power, comprising a connecting shaft for each spit affixed at one end to said source of power and terminating at the other end in an enlarged head provided with a lug; a similar head and lug on one end of each spit; and a pair of U-shaped brackets for each spit, affixed to the frame of said roaster, one of each of said pairs of brackets being adapted to support and retain the head of a connecting shaft and the head of a spit in juxtaposition with the lugs in engagement, the other of said pair of U-shaped brackets adapted to support loosely the other end of the spit, whereby said spits may be removed from the roaster and replaced therein without adjustment.

In testimony whereof I have signed my name to this specification.

WILLIAM S. GOODELL.